Figure 1:
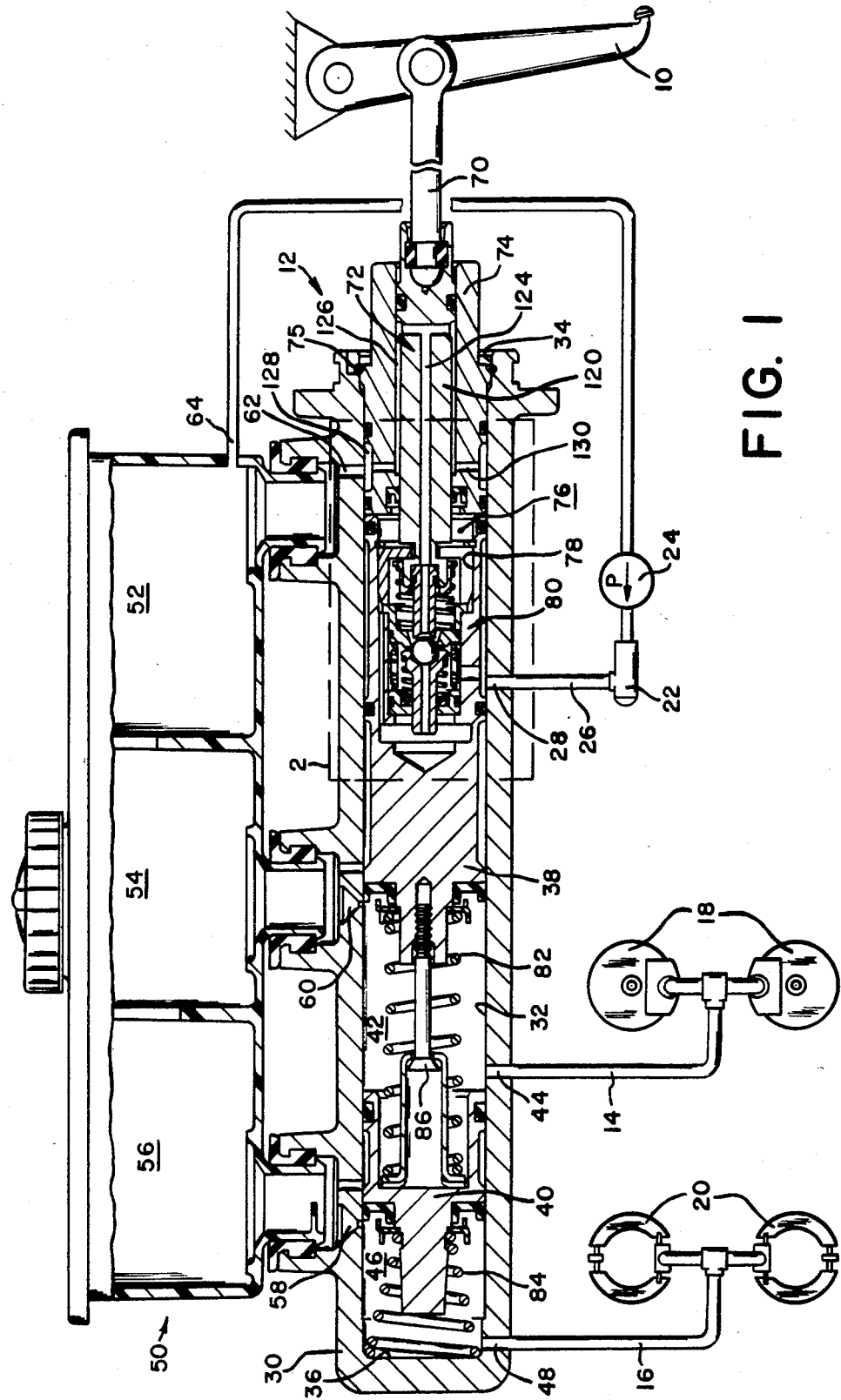

United States Patent [19]

Brown et al.

[11] Patent Number: 4,514,981
[45] Date of Patent: May 7, 1985

[54] BRAKE BOOSTER

[75] Inventors: Arthur K. Brown, South Bend; Keith H. Fulmer, Mishawaka; Jerome T. Ewald, South Bend, all of Ind.

[73] Assignee: Allied Corporation, Morristown, N.J.

[21] Appl. No.: 460,725

[22] Filed: Mar. 7, 1983

[51] Int. Cl.³ .............................................. B60T 13/00
[52] U.S. Cl. ..................................... 60/547.1; 91/434; 251/84; 251/86
[58] Field of Search ................. 60/547.1, 548; 251/86, 251/84; 91/376 R, 434

[56] References Cited

U.S. PATENT DOCUMENTS

| 3,220,190 | 11/1965 | Schultz | 60/566 |
| 3,257,912 | 6/1966 | Vander Herst | 91/49 |
| 3,519,245 | 7/1970 | Hyde | 251/86 |
| 3,526,089 | 9/1970 | Fulmer | 60/54.5 |
| 3,691,903 | 9/1922 | Shellhause | 91/49 |
| 3,747,473 | 7/1973 | Bach | 91/376 R |
| 4,235,416 | 11/1980 | La Coste | 251/86 |
| 4,248,403 | 2/1981 | Scull | 251/86 |
| 4,278,009 | 7/1981 | Demido | 91/434 |
| 4,388,806 | 6/1983 | Szarka | 60/547.1 |
| 4,408,745 | 10/1983 | Swiers | 251/86 |
| 4,433,543 | 2/1984 | Thomas | 60/547.1 |

Primary Examiner—Abraham Hershkovitz
Attorney, Agent, or Firm—Larry J. Palguta; Ken C. Decker

[57] ABSTRACT

A brake booster includes a housing with at least one piston therein to separate a pressure chamber from a work chamber. A valve assembly carried by the one piston is operable to communicate fluid pressure to the work chamber to move the piston. An input assembly is movable to control operation of the valve assembly.

6 Claims, 2 Drawing Figures

BRAKE BOOSTER

This invention relates to a brake booster wherein fluid pressure is utilized to provide a power assist during a brake application.

A brake booster includes a housing with a bore receiving at least one piston. A valve assembly disposed within the housing cooperates with an input assembly so that during braking fluid pressure is communicated to one side of the piston to move the latter to a braking position. The valve assembly includes a hollow stem with a passage therethrough and a valve member. In the brake applied position, the hollow stem is engaged with the valve member to open fluid communication between a fluid pressure source and a work chamber on the one side of the piston. While in the rest position, the hollow stem is spaced from the valve member to open the work chamber to a reservoir.

The prior art is illustrated by U.S. Pat. Nos. 2,410,269; 3,183,670; 3,220,190; and 3,747,473.

When the hollow stem is engaged with the valve member, the passage leading to the reservoir is closed, so that fluid pressure acting against the piston is confined to the work chamber. If the hollow stem fails to completely seal the passage when in engagement with the valve member, fluid pressure communicated to the work chamber will leak to the reservoir. This fluid pressure leak reduces the power assist during braking and requires extra effort by a vehicle operator during braking.

The present invention comprises a brake booster having a housing with at least one outlet communicating with a brake, a piston movably disposed within the housing to separate a pressure chamber from a work chamber, the piston defining a cavity facing the work chamber, a valve assembly disposed within the cavity and an inlet formed by the housing to communicate fluid pressure to the valve assembly whereby the latter is operable in response to movement of an input assembly to control communication of fluid pressure to the work chamber wherein the fluid pressure biases the piston to move from a rest position to a braking position, the valve assembly including a valve member normally closing fluid communication between the fluid pressure source and the work chamber, the input assembly including an end projection with a passage therein normally communicating the work chamber with a reservoir associated with the brake booster, and the end projection is sealingly engageable with the valve member to close the passage when the valve member is moved by the end projection to communicate the fluid pressure source with the work chamber, characterized in that said end projection comprises a separate part from the remaining portion of said input assembly and said end projection is free to form an angular relationship with said remaining portion to permit said end projection to move angularly relative to said remaining portion when said end projection is forming a sealing engagement with said valve member.

It is an advantage of the present invention that the input assembly is permitted an angular orientation within the housing in order to accommodate any offset between the end projection or hollow stem and the valve member. In addition, a sealing member carried by the input assembly seals the passage from the fluid pressure in the work chamber and also biases the end projection to a coaxial relationship with the remaining portion of the input assembly.

The invention will now be described with reference to the accompanying drawings, which illustrate only one embodiment for the invention.

Figure 2:
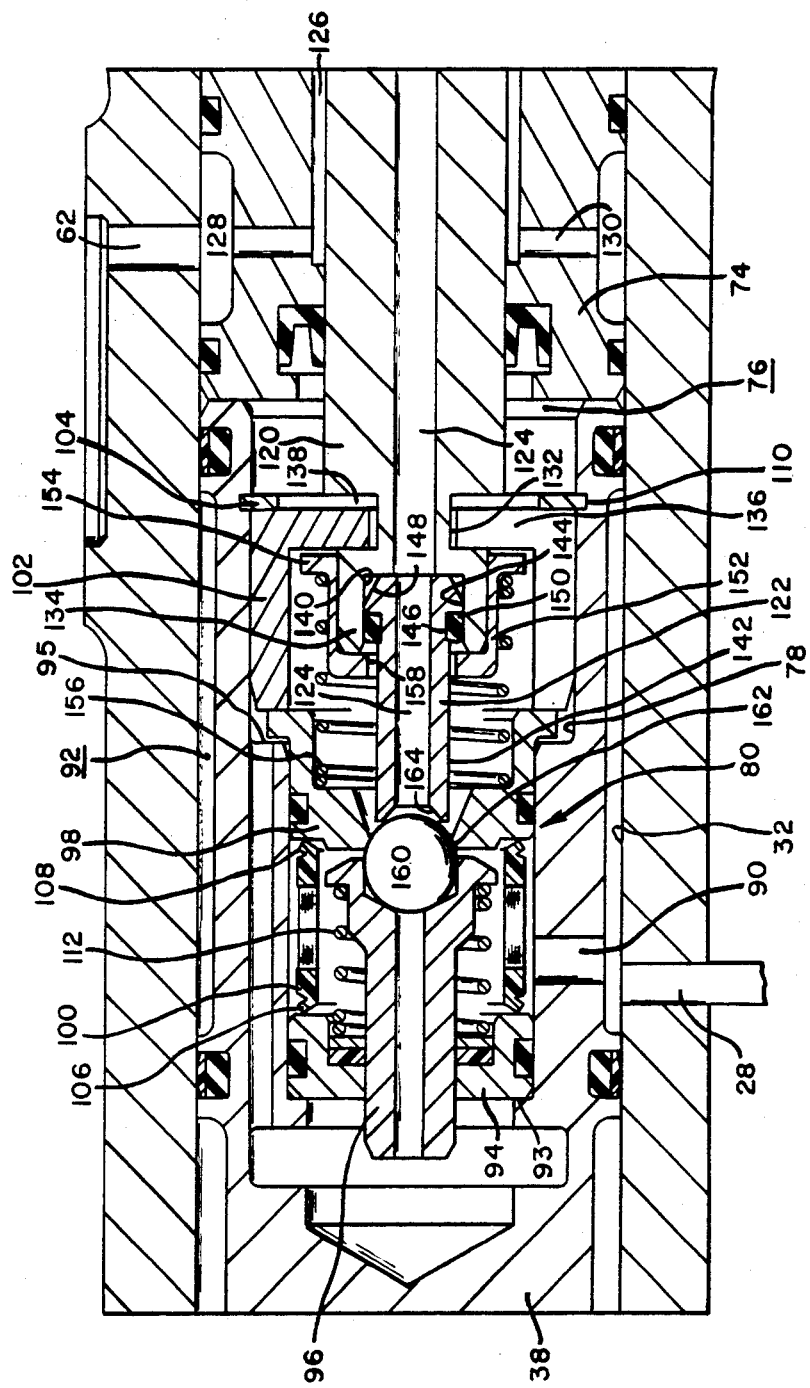

FIG. 1 is a schematic view of a brake system showing the brake booster of the present invention in cross-section; and FIG. 2 is an enlarged view of the circumscribed portion 2 in FIG. 1.

A brake system includes a brake pedal 10 connected to a brake booster 12. The brake booster 12 includes conduits 14 and 16 communicating, respectively, with brakes 18 and 20 associated with vehicle wheels. A fluid pressure source or accumulator 22 is maintained at a predetermined fluid pressure level by a pump 24 and the accumulator 22 is in communication with the brake booster 12 via a conduit 26 and a brake booster inlet 28. The brake system operates in a conventional manner in that movement of the brake pedal to an actuated or braking position results in the brake booster 12 communicating fluid pressure to the brakes 18 and 20.

The brake booster 12 includes a housing 30 with a bore 32 leading from an open end 34 to a bottom wall 36. A primary piston 38 cooperates with a secondary piston 40 and the housing 30 to define a primary pressure chamber 42 therebetween which communicates via a first outlet 44 with the conduit 14. The secondary piston 40 cooperates with the housing 30 to define a secondary pressure chamber 46 at the bottom wall in communication with the conduit 16 via a second outlet 48.

A reservoir 50 includes three chambers 52, 54 and 56. The chamber 56 communicates via port 58 with the secondary pressure chamber 46 when the secondary piston 40 is in a rest position, as shown. The chamber 54 communicates via port 60 with the primary pressure chamber 42 when the primary piston 38 is in a rest position, as shown. The chamber 52 communicates with the bore 32 near the open end 34 via port 62 and also communicates with the pump 24 via conduit 64.

An input member 70 connects with the brake pedal 10 and extends into the bore 32. An input assembly 72 connects with the input member 70 and cooperates with a plug 74 to close the open end 34 of the bore 32. A snap ring 75 retains the plug within the bore 32. The input assembly 72 cooperates the plug 74 to define a work chamber 76 within the bore 32 adjacent the right side of the primary piston 38. The primary piston 38 is provided with a cavity 78 opening to the work chamber and receiving a valve assembly 80 therein for cooperation with the input assembly in a manner hereinafter described. A spring 82 between the pistons 38 and 40 biases the primary piston 38 to its rest position abutting the plug 74. A spring 84 between the end wall 36 and the secondary piston 40 biases the latter to its rest position abutting a top hat assembly 86 secured to the primary piston 38.

Turning to FIG. 2, the primary piston 38 defines a radially extending opening 90 leading from a clearance 92 within the bore 32 between the housing 30 and primary piston in order to communicate the inlet 28 with the cavity 78. The valve assembly 80 within the cavity 78 includes a sealing ring 94 with an opening receiving a valve member 96 and a valve seat 98 engages the end of the valve member 96 in a rest position for the latter. A filter 100 is disposed between the sealing ring 94 and the valve seat 98 so that all of the fluid communicated through the opening 90 is filtered to remove contaminantes therefrom. In order to retain the valve assembly 80 within the cavity 78, a sleeve 102 engages the valve seat 98 and a snap ring 104 opposes withdrawal of the sleeve. The filter 100 includes resilient end tabs 106 and 108 at each end so that when the snap ring 104 is inserted in the piston recess 110, the tabs 106 and 108 are compressed axially to insure a tight fit between the sealing ring 94 and the valve seat 98. The tabs 106 and 108 also accommodate axial tolerances between the sealing ring 94, the valve seat 98 and the sleeve 102 to relieve these parts of stack up axial tolerances with shoulders 93 and 95. A spring 112 extends between the sealing ring 94 and the valve member 96 to bias the latter into engagement with the valve seat 98. With the valve member 96 engaging the valve seat 98, fluid pressure communicated through opening 90 is trapped on the left side of the valve seat 98. The effective area for the valve seat 98 is equal to the diameter of the valve member extending through the sealing ring 94 so the valve member is substantially pressure balanced.

The input assembly 72 includes an input rod 120 and an end projection 122. The rod and projction include axial passages 124 leading from the work chamber 76 to a plug clearance 126, which in turn communicates to a clearance 128 via opening 130 in communication with the port 62 for the reservoir. Therefore, in the rest position of the input assembly 72, the work chamber 76 is in communication with the reservoir chamber 52. The input rod 120 forms a groove 132 adjacent an enlarged head 134. The sleeve 102 is slotted at 136 to permit transverse attachment of the sleeve 102 to the input rod 120. With the sleeve in the groove 132 an axial clearance 138 is formed between the sleeve and input rod to permit slight relative axial movement therebetween. The enlarged head 134 defines a recess 140 leading to the rod passage 124 and the end projection 122 is disposed within the recess 140. The end projection 122 forms a small diameter portion 142 adjacent the valve seat 98 and a large diameter portion 144. The large diameter portion separates a groove 146 on the end projection from a tapered edge 148. The groove 146 receives a seal 150. The seal 150 engages the wall of recess 140 to yieldably dispose the end projection 122 coaxial with the input rod 120. A collar 152 is fitted over the enlarged head 134. The collar 152 forms a flange 154 acting as a spring rest for a spring 156. The spring extends from the valve seat 98 to the collar to bias the enlarged head to a rest position adjacent the sleeve 102 and in spaced relation to the valve member 96. The collar forms an opening 158 receiving the end projection with a radial clearance between the wall of opening 158 and the end projection. The diameter of the collar flange 154 is larger than the width of the slot 136 so that the sleeve 102 is prevented from separating from the rod 120 so long as the collar 152 remains fitted to the enlarged head 134.

The valve member 96 includes a ball 160 engageable with a part-spherical edge 162 on the valve seat 98. The left end 164 of the end projection 122 is engageable with the ball 160 during braking to close the passage 124 and move the ball 160 away from the edge 162. In order to permit the end 164 to seek alignment with the ball 160, the end projection 122 is capable of pivoting relative to the head 134. Therefore, if the valve member 96 and the input assembly are not exactly co-axial, it is possible for the end projection to seek sealing contact with the ball 160 when the end 164 engages the ball 160. The wall of collar opening 158 defines a limit for the angular orientation of the end projection relative to the input rod. The seal 150 biases the end projection to a coaxial orientation relative to the input rod 120 and also seals the end projection to the input rod to prevent leakage of fluid pressure at the connection of the end projection and the input rod. The seal 150 permits an angular orientation of the end projection relative to the input rod while maintaining a sealing engagement therebetween.

During a brake application the pedal 10 is depressed by a vehicle operator to move the input assembly 72 toward the primary piston 38. The end projection 122 engages the ball 160 to seek a sealing engagement therewith in order to close communication between the work chamber 76 and the passage 124. Further movement of the input assembly moves the ball 160 away from the edge 162 so that fluid pressure from the accumulator 22 is communicated to the work chamber via conduit 26, inlet 28, clearance 92, opening 90, filter 100, edge 162 and slot 136. Fluid pressure in the work chamber 76 acts against the primary piston to move the latter to the left. As a result, the chambers 42 and 46 are contracted to generate fluid pressure for the brake assemblies 18 and 20. The input assembly moves with the primary piston. When a predetermined fluid pressure level is reached in the work chamber 78 corresponding to an associated brake pedal input force the primary piston moves slightly relative to the end projection to reengage the ball with the seat edge 162 to prevent further build up of fluid pressure in the work chamber. Further braking separates the ball from the valve seat to increase the communication of fluid pressure to the work chamber. Upon termination of braking, the spring 156 biases the enlarged head to abut the sleeve 102 in order to reengage the ball 160 with the seat 98 and close the communication of fluid pressure to the work chamber. The springs 82 and 84 bias the pistons and the input assembly to return to their rest position.

In the event of a failure in the fluid pressure source or in the communication of the latter to the work chamber, it is possible to manually push the input assembly so that the wall of groove 132 is engageable with the right side of sleeve 102 so that the input assembly will move the primary and secondary pistons to generate fluid pressure for the brake systems 18 and 20.

We claim:

1. A brake booster having a housing with at least one outlet communicating with a brake, a piston movably disposed within the housing to separate a pressure chamber from a work chamber, the piston defining a cavity facing the work chamber, a valve assembly disposed within the cavity and an inlet formed by the housing to communicate fluid pressure to the valve assembly whereby the latter is operable in response to movement of an input assembly to control communication of fluid pressure to the work chamber wherein the fluid pressure biases the piston to move from a rest position to a braking position, the valve assembly including a valve member normally closing fluid communication between the fluid pressure source and the work chamber, the input assembly including an end projection with a passage therein normally communicating the work chamber with a reservoir associated with the brake booster, and the end projection is sealingly engageable with the valve member to close the passage when the valve member is moved by the end projection to communicate the fluid pressure source with the work chamber, characterized in that said end projection comprises a separate part from the remaining portion of said input assembly and said end projection is free to form an angular relationship with said remaining portion to permit said end projection to move angularly relative to said remaining portion when said end projection is forming a sealing engagement with said valve member, said end projection cooperating with said remaining portion of said input assembly to carry a sealing member therebetween, said sealing member sealing said passage from the fluid pressure communicated to the work chamber, the sealing member further biasing said end projection to a coaxial relationship with said remaining portion, the remaining portion terminating in an enlarged head adjacent said end projection for receiving the latter, said enlarged head carrying a collar, a spring engaging said collar to bias the remaining portion to a rest position and the collar cooperating with said end projection to limit the angular relationship between said end projection and remaining portion.

2. The brake booster of claim 1 in which said collar cooperates with said end projection to oppose separation of said end projection and said remaining portion when said spring is engaged with said collar.

3. The brake booster of claim 1 in which said piston carries a sleeve fixedly disposed therein to retain said valve seat within said piston, said sleeve being slotted to define a fluid path from said valve member to said work chamber and said slot further permitting transverse attachment of said sleeve to said input assembly.

4. The brake booster of claim 3 in which said collar is connected to said enlarged head after said sleeve is attached to said input assembly and said collar prevents transverse separation between said sleeve and said input assembly when said collar is carried by said enlarged head.

5. The brake booster of claim 1 wherein said enlarged head includes a recess receiving said end projection, said end projection defining a groove within said recess for carrying said sealing member, and said groove separating a small diameter portion of said end projection extending outwardly from said recess from a substantially tapered outer portion of said end projection extending from an axially extending wall of said recess to a radially extending bottom wall of said recess.

6. The brake booster of claim 1 in which said valve assembly includes a filter surrounding said valve member and all of the fluid communicated from said fluid pressure source to said work chamber passes through said filter, said filter being deformable to accommodate manufacturing tolerances between said valve assembly and said piston.

* * * * *